(No Model.)

C. F. KOEHLER.
APPARATUS FOR THE PASTEURIZATION OF BEER.

No. 399,200. Patented Mar. 5, 1889.

Attest:
W. M. Hegel
F. C. Sharp

Inventor:
Chas. F. Koehler

UNITED STATES PATENT OFFICE.

CHARLES F. KOEHLER, OF ST. LOUIS, MISSOURI.

APPARATUS FOR THE PASTEURIZATION OF BEER.

SPECIFICATION forming part of Letters Patent No. 399,200, dated March 5, 1889.

Application filed June 18, 1888. Serial No. 277,471. (No model.)

*To all whom it may concern:*

Be it known that I, CHARLES F. KOEHLER, a citizen of the United States, residing in the city of St. Louis, in the State of Missouri, have invented a new and useful Improvement in Apparatus for the Pasteurization of Beer, of which the following is a specification.

My invention relates to improvements in the mode of introducing steam into the steaming-vats, in which the bottles filled with beer from the brewery are placed and covered with cold water, and then subjected to heat by introducing steam into the vat containing the bottled beer and water and heating the contents to a sufficient degree to destroy the yeast molecules in the beer contained in the bottles and arrest fermentation, thus bringing about that condition of the beer called "pasteurization;" and the object of my invention is, first, to provide a continuous distribution of the heat throughout the water from the top downward, thus saving breakage; second, to afford facilities for obtaining an equalization of the heat of the water and bottled contents of the vat; third, to reduce the amount of the surface of steam-pipe heretofore used and dispense with the holes or perforations therein; fourth, to insure the direct contact of every part of the water in the vat to the steam-supply. I attain these objects by the mechanism illustrated in the accompanying drawings, in which—

Figure 1:
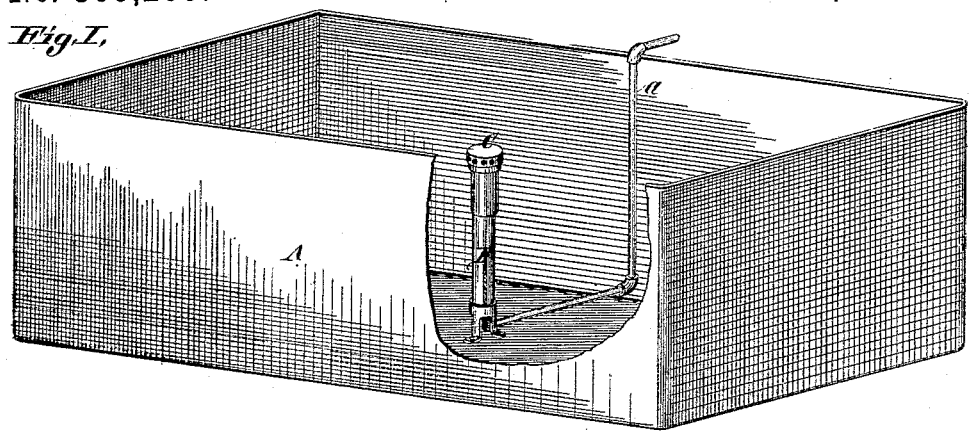
Figure 2:
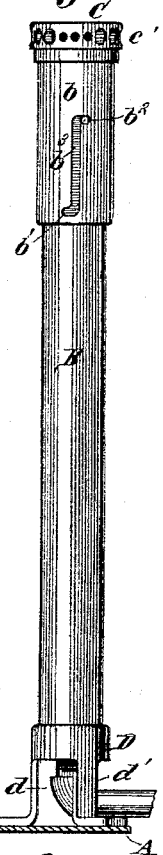
Figure 3:
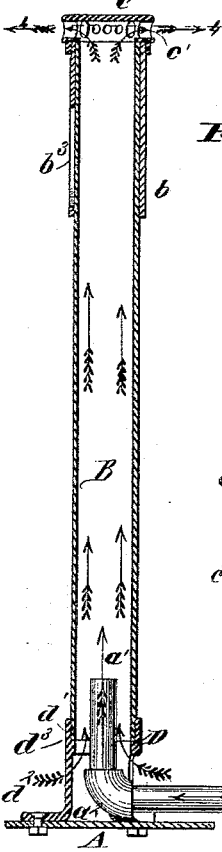
Figure 4:
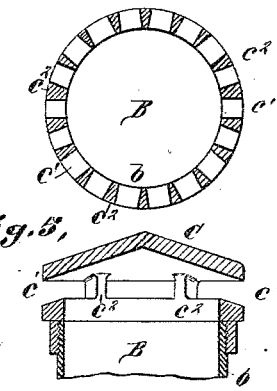
Figure 5:
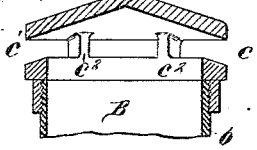
Figure 6:
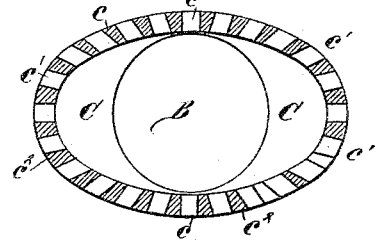

Figure 1 is a perspective view of the vat for steaming bottled beer, with a portion of one side broken away, showing my invention fastened in its place in the vat and connected with the steam-supply; Fig. 2, a perspective view of the receiver and distributer as it appears when ready for use; Fig. 3, a vertical view, in cross-section, of the receiver and distributer, showing its operation; Fig. 4, a cross-section of the top or cap of the receiver and distributer through line 44, Fig. 3; Fig. 5, a modified detail of a top or cap of the machine, and Fig. 6 another form or modification of the same.

Similar letters and figures refer to similar parts throughout the several views.

The vat or tub A, being placed in a convenient position in the bottling-room, constitutes the frame-work of the machine. The steam-supply pipe $a$ is led from the boiler over the sides and ends of the vat A and passes down its inside wall to the bottom, and thence to the middle of the vat, where it is provided with an elbow, to which is vertically attached a small piece of pipe, $a'$, from whence the steam is discharged into the receiver at a point a short distance below the opening $d$ in the receiver-supports $d'$. Directly over and around the vertical section of the steam-pipe $a'$ is placed the receiver and distributer, which consists of the socket D, provided with the legs or standards $d'$, having openings $d$ between. This socket is secured to the bottom of the vat A by bolts, nails, screws, or otherwise. The upper part of the tube B is provided at its upper end with an outer tube or collar, $b$, which is snugly fitted over and around the tube B, and has a vertical slot, $b'$, regulated by a pin or set-screw, $b^2$, permitting of vertical adjustment of the machine to any desired height.

C is the deflecting and distributing cap or top of the machine. This cap is fastened to the outer top tube, $b$, and has the openings or open spaces $c'$ and standards $c^2$, whereby the heated commingled water and steam from the steam-supply is thrown outward on all sides in the direction of the arrows shown at 44, Fig. 3, and thence it takes a downward course, converging toward the openings $d$ in the machine-socket, where it is again placed in contact with the steam-supply jet and again heated and distributed as before, repeating the operation until the whole mass of water and vat contents have reached the desired temperature.

The mode heretofore employed in "pasteurizing" bottled beer was to run a steam-pipe, provided with holes to permit of the escape of the steam of the pipe into the vat, all around it at the bottom. The pipe was rapidly worn out and rendered unfit for service from the rapid corrosion of the iron around the holes in it. It is apparent that that system required much more piping than is necessary with the use of my machine, and the steam arising therein from the bottom of the tub attacked the bottles at their weakest and most vulnerable point—viz., the bottom—where the heat was greater than at the upper portion. All of these annoyances and expenses are avoided in the use of my apparatus.

Having described my invention, what I claim as new, and desire to secure by Letters Patent, is—

The combination, with an open vat or tub in which bottled beer is pasteurized, of the centrally-located upright pipe or tube having openings between its legs by which it is secured to the vat-bottom, and a deflecting-cap supported over openings at the top of said pipe in conjunction with a steam-supply pipe having its opening or discharge immediately below the lower openings in the center of said stand-pipe, all substantially as shown and described, and for the purpose specified.

CHARLES F. KOEHLER.

Witnesses:
S. S. MERRILL,
W. M. HEZEL.